United States Patent
Drobek

(10) Patent No.: US 6,186,082 B1
(45) Date of Patent: Feb. 13, 2001

(54) SEED PLANTER

(76) Inventor: Carl R. Drobek, 248 Broad St., Sinking Springs, PA (US) 19608

(*) Notice: Under 35 U.S.C. 154(b), the term of this patent shall be extended for 0 days.

(21) Appl. No.: 09/238,601

(22) Filed: Jan. 28, 1999

(51) Int. Cl.[7] .................................................. A01C 7/02
(52) U.S. Cl. ............................................. 111/92; 111/95
(58) Field of Search ............................... 111/92, 95, 106; 172/371, 377, 378, 380, 381; 221/247, 303

(56) References Cited

U.S. PATENT DOCUMENTS

| | | | |
|---|---|---|---|
| 340,211 | * | 4/1886 | Harris ................................... 111/106 |
| 411,225 | * | 9/1889 | Nissley et al. ....................... 111/106 |
| 646,544 | * | 4/1900 | Johnson ................................ 111/92 |
| 1,296,771 | * | 3/1919 | Dady ..................................... 111/92 |
| 1,347,249 | * | 7/1920 | Castillo ................................. 111/92 |
| 2,361,005 | * | 10/1944 | Baer ...................................... 111/92 |
| 2,865,315 | * | 12/1958 | Goldstein .............................. 111/92 |
| 3,831,808 | * | 8/1974 | Bender ................................. 221/197 |
| 3,863,804 | * | 2/1975 | Infante-Diaz et al. ............... 221/251 |
| 4,084,726 | * | 4/1978 | Nicol ..................................... 111/96 |
| 4,165,697 | * | 8/1979 | Yeager et al. ........................ 111/92 |
| 4,694,760 | * | 9/1987 | Camp .................................... 111/92 |
| 4,760,807 | * | 8/1988 | Keller .................................... 111/92 |
| 5,117,982 | * | 6/1992 | Shotthafer et al. .................. 209/614 |
| 5,398,624 | * | 3/1995 | Caron ................................... 111/106 |
| 5,431,115 | * | 7/1995 | Auer ..................................... 111/92 |
| 5,489,049 | * | 2/1996 | Robbins, III ......................... 222/448 |
| 5,493,977 | * | 2/1996 | Maisch ................................. 111/92 |
| 5,802,994 | * | 9/1998 | Kinkead et al. ..................... 221/253 |
| 5,870,961 | * | 2/1999 | Morin .................................... 111/95 |

FOREIGN PATENT DOCUMENTS

| | | | |
|---|---|---|---|
| 678859 | * | 9/1952 | (GB) ..................................... 111/92 |
| 1483549 | * | 8/1977 | (GB) ..................................... 111/92 |

* cited by examiner

Primary Examiner—Robert E. Pezzuto
Assistant Examiner—Nathan Mammen

(57) ABSTRACT

A seed planter for planting seeds in soil. The seed planter includes a container with opposite open front and back ends and front and rear end caps covering respective ends of the container. The front end cap has a hole therethrough. A gate is slidably mounted on the front end cap. The front end cap has an outwardly extending spout adjacent the hole of the front end cap.

19 Claims, 2 Drawing Sheets

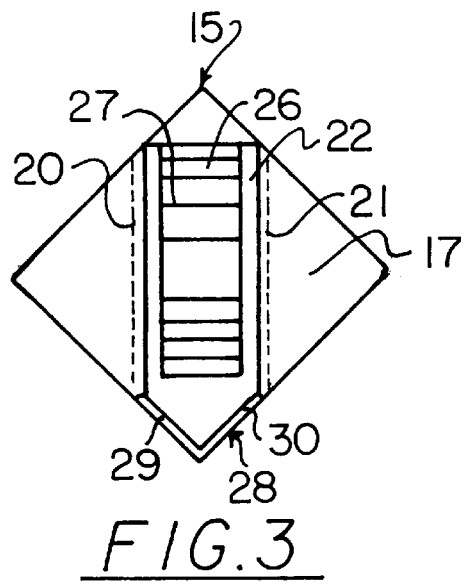
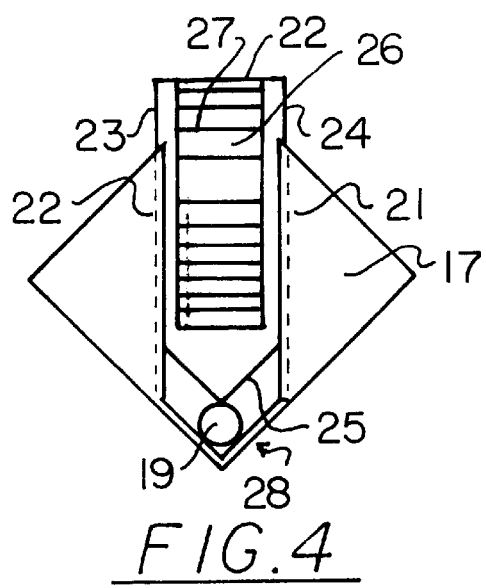
FIG. 3
FIG. 4
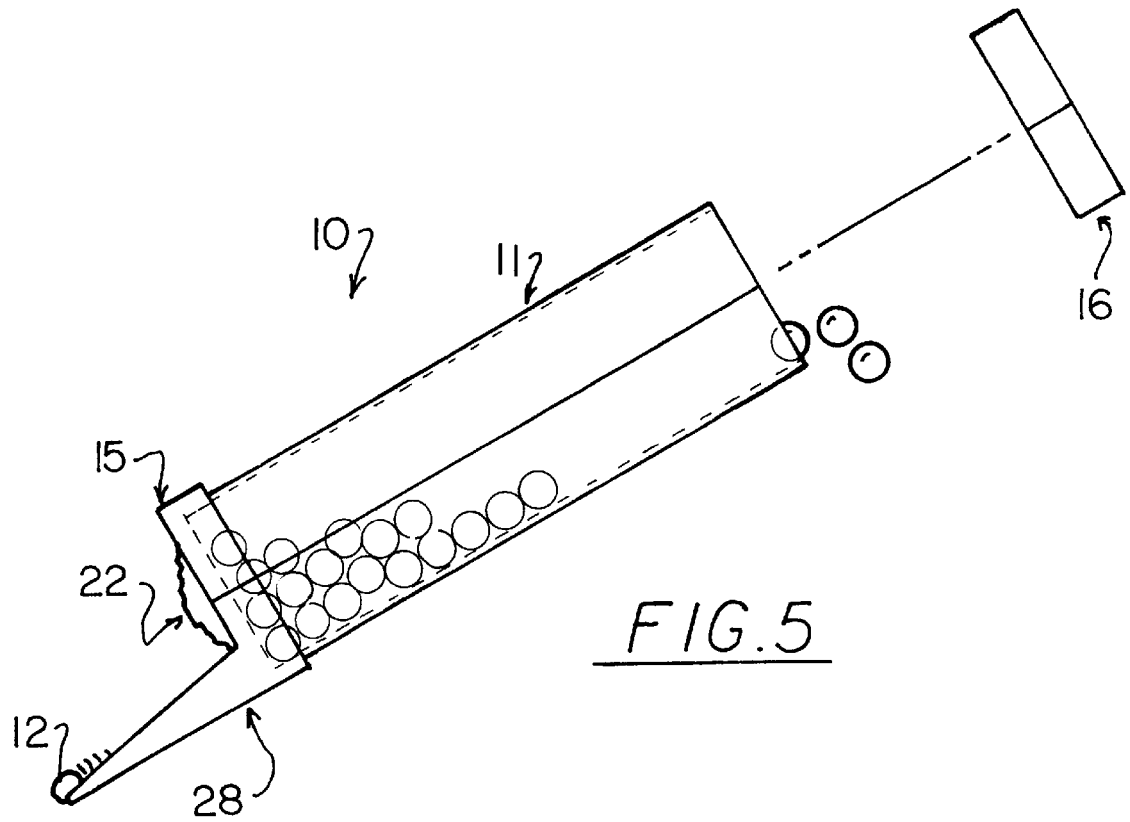
FIG. 5

SEED PLANTER

BACKGROUND OF THE INVENTION

1. Field of the Invention

The present invention relates to seed planters and more particularly pertains to a new seed planter for planting seeds in soil.

2. Description of the Prior Art

The use of seed planters is known in the prior art. More specifically, seed planters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,347,249 by Castillo; U.S. Pat. No. 4,084,726 by Nicol; U.S. Pat. No. Des. 371,057 by Nicol; U.S. Pat. No. 2,865,315 by Goldstein; U.S. Pat. No. 4,760,807 by Keller; and U.S. Pat. No. 5,493,977 by Maisch.

While these devices fulfill their respective, particular objectives and requirements, the aforementioned patents do not disclose a new seed planter. The inventive device includes a container with opposite open front and back ends and front and rear end caps covering respective ends of the container. The front end cap has a hole therethrough. A gate is slidably mounted on the front end cap. The front end cap has an outwardly extending spout adjacent the hole of the front end cap.

In these respects, the seed planter according to the present invention substantially departs from the conventional concepts and designs of the prior art, and in so doing provides an apparatus primarily developed for the purpose of planting seeds in soil.

SUMMARY OF THE INVENTION

In view of the foregoing disadvantages inherent in the known types of seed planters now present in the prior art, the present invention provides a new seed planter construction wherein the same can be utilized for planting seeds in soil.

The general purpose of the present invention, which will be described subsequently in greater detail, is to provide a new seed planter apparatus and method which has many of the advantages of the seed planters mentioned heretofore and many novel features that result in a new seed planter which is not anticipated, rendered obvious, suggested, or even implied by any of the prior art seed planters, either alone or in any combination thereof.

To attain this, the present invention generally comprises a container with opposite open front and back ends and front and rear end caps covering respective ends of the container. The front end cap has a hole therethrough. A gate is slidably mounted on the front end cap. The front end cap has an outwardly extending spout adjacent the hole of the front end cap.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new seed planter apparatus and method which has many of the advantages of the seed planters mentioned heretofore and many novel features that result in a new seed planter which is not anticipated, rendered obvious, suggested, or even implied by any of the prior art seed planters, either alone or in any combination thereof.

It is another object of the present invention to provide a new seed planter which may be easily and efficiently manufactured and marketed.

It is a further object of the present invention to provide a new seed planter which is of a durable and reliable construction.

An even further object of the present invention is to provide a new seed planter which is susceptible of a low cost of manufacture with regard to both materials and labor, and which accordingly is then susceptible of low prices of sale to the consuming public, thereby making such seed planter economically available to the buying public.

Still yet another object of the present invention is to provide a new seed planter which provides in the apparatuses and methods of the prior art some of the advantages thereof, while simultaneously overcoming some of the disadvantages normally associated therewith.

Still another object of the present invention is to provide a new seed planter for planting seeds in soil.

Yet another object of the present invention is to provide a new seed planter which includes a container with opposite open front and back ends and front and rear end caps covering respective ends of the container. The front end cap has a hole therethrough. A gate is slidably mounted on the front end cap. The front end cap has an outwardly extending spout adjacent the hole of the front end cap.

Still yet another object of the present invention is to provide a new seed planter that gives a user control over the number of seeds being planted to help avoid over-seeding of the soil.

Even still another object of the present invention is to provide a new seed planter that is small enough to be easily grasped in the hand of a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic exploded side view of the present invention with the rear end cap detached from the back end of the container.

FIG. 4 is a schematic front end view of the present invention with the gate in a first position.

FIG. 5 is a schematic front end view of the present invention with the gate in a second position to expose the hole in the front end cap.

DESCRIPTION OF THE PREFERRED EMBODIMENT

Figure 1:
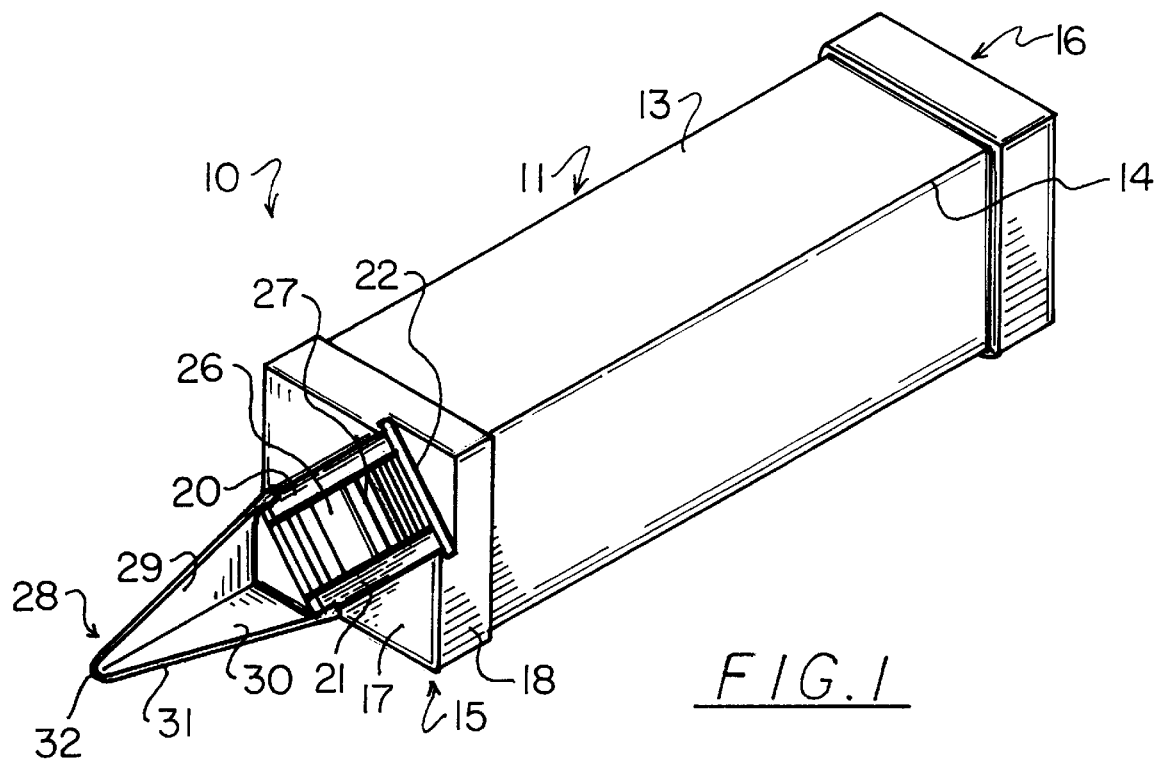
FIG. 1 is a schematic perspective view of a new seed planter according to the present invention.
Figure 2:
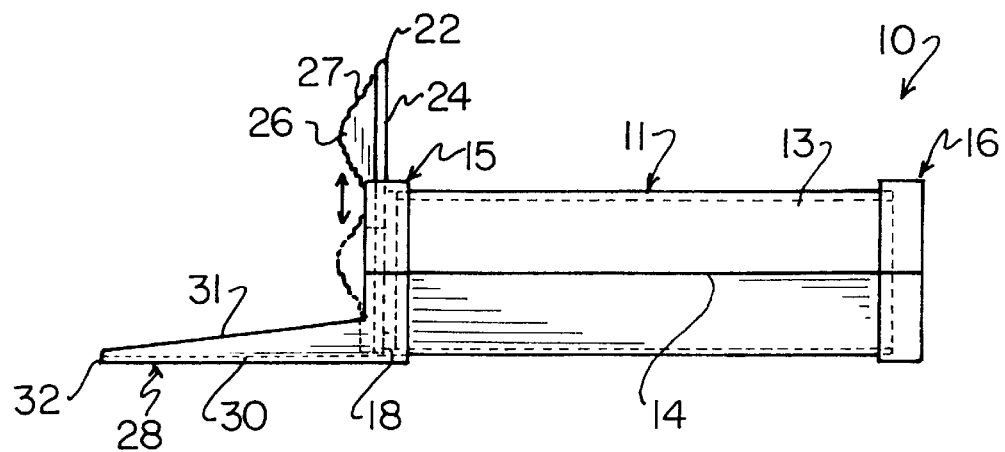
FIG. 2 is a schematic side view of the present invention.

With reference now to the drawings, and in particular to FIGS. 1 through 5 thereof, a new seed planter embodying the principles and concepts of the present invention and generally designated by the reference numeral 10 will be described.

As best illustrated in FIGS. 1 through 5, the seed planter 10 generally comprises a container with opposite open front and back ends and front and rear end caps covering respective ends of the container. The front end cap has a hole therethrough. A gate is slidably mounted on the front end cap. The front end cap has an outwardly extending spout adjacent the hole of the front end cap.

In closer detail, the seed planter 10 comprises a tubular container 11 with has opposite open front and back ends, and a longitudinal axis extending between the front and back ends of the container. In use, the container is designed for holding seeds 12 therein. The container has a generally rectangular transverse cross section substantially perpendicular to the longitudinal axis of the container and has a plurality of alternating side faces 13 and side edges 14 extending between the ends of the container. The ends of the container preferably lie in substantially parallel planes to one another substantially perpendicular to the longitudinal axis of the container. In the preferred embodiment, a first pair of opposite side faces of the container lie in substantially parallel planes to one another while a second pair of opposite side faces of the container lie in substantially parallel planes to one another substantially perpendicular to the planes of the first pair of opposite side faces of the container. The container has a length defined between the ends of the container. Each of the side faces of the container has a width defined between adjacent pairs of side edges of the container. Ideally, the length of the container is about 3 inches to comfortably fit in the hand of a user and the width of each of the side faces of the container is about ¾ inch to also comfortably fit in the hand of a user.

A generally rectangular front end cap 15 substantially covers the front end of the container and a generally rectangular rear end cap 16 substantially covers the back end of the container. The front and rear end caps each have a generally rectangular cover panel 17 and a perimeter lip 18 extending around the cover panel of the respective end cap. The cover panels of the end caps each substantially cover the associated end of the container. The perimeter lips of the end caps each are extended around the side faces and side edges of the container adjacent the associated end of the container. The perimeter lips of the end caps preferably frictionally hold each end cap to the associated end of the container. In use, the rear end cap is designed for removal from the container to permit filling of the container with seeds through the back end of the container as illustrated in FIG. 5.

The cover panel of the front end cap has a plurality of alternating sides and corners. Each of the sides of the cover panel of the front end cap is associated with a side face of the container and each of the corners of the cover panel of the front end cap is associated with a side edge of the container. Each of the sides and corners of the cover panel of the front end cap are positioned adjacent the associated side faces and side edges of the container. The front end cap has a generally circular hole 19 through the cover panel of the front end cap adjacent a first of the corners of the front end cap. In use, the hole of the front end cap is designed for permitting passage therethrough of seeds in the container. In an ideal embodiment, the hole has a diameter of about 7/32 inch.

The front end cap also has a spaced apart pair of substantially parallel side rails 20,21 on the cover panel of the front end cap extending between an opposite pair of the corners of the cover panel of the front end cap. The hole of the front end cap is positioned between the side rails of the front end cap.

A generally rectangular gate 22 is slidably mounted on the cover panel of the front end cap. The gate has a pair of substantially parallel sides 23,24. One of the sides of the gate is slidably mounted to one of the side rails and the other of the sides of the gate is slidably mounted to the other of the side rails. In the ideal illustrative embodiment, the gate has a width defined between the sides of the gate of about 7/16 inch. The gate also has a V-shaped end 25 adjacent the first corner of the cover panel of the front end cap. In use, the gate is designed for permitting a user to selectively open and close the hole of the front end cap to control the number of seeds passing through the hole. The gate is slidable between first and second positions. The gate substantially covers the hole of the front end cap when the gate is positioned in the first position. When the gate is positioned in the second position, the gate substantially uncovering the hole of the front end cap.

The gate also has a generally semi-circular extent 26 outwardly extending therefrom in a direction away from the cover panel of the front end cap. In use, the extent is designed for placing a user's thumb or finger thereon to slide the gate between the first and second positions. Preferably, the extent of the gate has a plurality of substantially parallel and spaced apart lateral ridges 27 for providing a frictionally enhanced surface with respect to a smooth surface for aiding the grip of a user's thumb or finger on the extent. The lateral ridges are extended substantially perpendicular to the sides of the gate.

The front end cap has a spout 28 outwardly extending from the cover panel of the front end cap. The spout is positioned adjacent the first corner of the cover plate of the front end cap. The spout has a generally V-shaped transverse cross section taken in a plane substantially parallel to the cover panel of the front end cap. The spout comprises a pair of generally triangular side panels 29,30. In one preferred embodiment, the side panels of the spout lie in planes forming an acute angle therebetween. In another preferred embodiment, the side panels of the spout lie in substantially perpendicular planes to one another substantially perpendicular to the cover panel of the front end cap.

Each of the side panels of the spout has a substantially straight outer edge 31 which converge together in an outwardly direction from the cover panel of the front end cap to a pointed tip 32. In use, the spout is designed for inserting the tip into soil and directing seeds exiting the container from the hole of the front cover panel into the soil adjacent the tip of the spout. In the ideal illustrative embodiment, the spout has a length defined from the cover panel of the front end cap to the top of the spout of about 1½ inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seed planter, comprising:

a container having opposite open front and back ends, and a longitudinal axis extending between said front and back ends of said container;

a front end cap substantially covering said front end of said container, a rear end cap substantially covering said back end of said container;

said front and rear end caps each having a cover panel and a perimeter lip extending around the cover panel of the respective end cap;

said cover panels of said end caps each substantially covering the associated end of said container, said perimeter lips of said end caps each being extending around said container adjacent the associated end of said container;

said front end cap having a hole through said cover panel of said front end cap;

a gate being slidably mounted on said cover panel of said front end cap;

said front end cap having a spout outwardly extending from said cover panel of said front end cap, said spout being positioned adjacent said hole of said front end cap;

wherein said front end cap has a spaced apart pair of substantially parallel side rails on said cover panel of said front end cap, said hole of said front end cap being positioned between said side rails of said front end cap, said gate having a pair of substantially parallel sides, one of said sides of said gate being slidably mounted to one of said side rails, the other of said sides of said gate being slidably mounted to the other of said side rails;

said container having a generally rectangular transverse cross section in a plane substantially perpendicular to said longitudinal axis of said container and having a plurality of alternating side faces and side edges extending between said ends of said container; and said hole of said front end cap being positioned adjacent a juncture of two of said side faces such that tilting of said container facilitates alignment of the seeds along a length of the juncture of said two side faces inside said container for positioning the seeds for movement through said hole in a one-by-one manner.

2. The seed planter of claim 1, wherein a first pair of opposite side faces of said container lying in substantially parallel planes to one another, a second pair of opposite side faces of said container lying in substantially parallel planes to one another substantially perpendicular to said planes of said first pair of opposite side faces of said container.

3. The seed planter of claim 2, wherein said ends of said container lie in substantially parallel planes to one another substantially perpendicular to said longitudinal axis of said container.

4. The seed planter of claim 1, wherein said perimeter lips of said end caps frictionally hold each end cap to the associated end of said container.

5. The seed planter of claim 1, wherein said gate has a generally semi-circular extent outwardly extending therefrom in a direction away from said cover panel of said front end cap, said extent of said gate having a plurality of substantially parallel and spaced apart lateral ridges.

6. The seed planter of claim 1, wherein said spout comprises a pair of generally triangular side panels, each of said side panels of said spout having a substantially straight outer edge, said outer edges of said side panels converging together in an outwardly direction from said cover panel of said front end cap to a pointed tip.

7. The seed planter of claim 6, wherein said side panels of said spout lie in planes forming an acute angle therebetween.

8. The seed planter of claim 6, wherein said side panels of said spout lie in substantially perpendicular planes to one another.

9. The seed planter of claim 1, wherein said ends of said container lying in substantially parallel planes to one another substantially perpendicular to said longitudinal axis of said container;

a first pair of opposite side faces of said container lying in substantially parallel planes to one another, a second pair of opposite side faces of said container lying in substantially parallel planes to one another substantially perpendicular to said planes of said first pair of opposite side faces of said container;

said container having a length defined between said ends of said container, each of said side faces of said container having a width defined between adjacent pairs of side edges of said container;

wherein said length of said container is about 3 inches for fitting a hand of a user, wherein said width of each of said side faces of said container is about ¾ inch for fitting the hand of the user;

said perimeter lips of said end caps each being extending around said side faces and side edges of said container adjacent the associated end of said container;

said perimeter lips of said end caps frictionally holding each end cap to the associated end of said container;

said rear end cap being removable from said container such that said container may be filled with seeds through said back end of said container;

said cover panel of said front end cap having a plurality of alternating sides and corners;

each of said sides of said cover panel of said front end cap being associated with a side face of said container, each of said corners of said cover panel of said front end cap being associated with a side edge of said container;

each of said sides and corners of said cover panel of said front end cap being positioned adjacent the associated side faces and side edges of said container;

said hole of said front end cap being adapted for permitting passage therethrough of seeds in said chamber;

said hole having a diameter of about 7/32 inch;

said side rails on said cover panel of said front end cap extending between an opposite pair of said corners of said cover panel of said front end cap;

said gate having a width defined between said sides of said gate of about 7/16 inch;

said gate being adapted for permitting the user to selectively open and close said hole of said front end cap for controlling the number of seeds passing through the hole;

said gate having first and second positions, said gate substantially covering said hole of said front end cap when said gate is positioned in said first position, said gate substantially uncovering said hole of said front end cap when said gate is positioned in said second position;

said gate having a generally semi-circular extent outwardly extending therefrom in a direction away from said cover panel of said front end cap;

said extent being adapted for placing a user's thumb or finger thereon to slide the gate between the first and second positions;

said extent of said gate having a plurality of substantially parallel and spaced apart lateral ridges, said lateral ridges being extended substantially perpendicular to said sides of said gate;

said spout being positioned adjacent said first corner of said cover plate of said front end cap;

said spout having a generally V-shaped transverse cross section taken in a plane substantially parallel to said cover panel of said front end cap;

said spout comprising a pair of generally triangular side panels;

said side panels of said spout lying in planes forming an acute angle therebetween;

said side panels of said spout lying is substantially perpendicular planes to one another substantially perpendicular to said cover panel of said front end cap; and each of said side panels of said spout having a substantially straight outer edge, said outer edges of said side panels converging together in an outwardly direction from said cover panel of said front end cap to a pointed tip;

said spout being adapted for inserting said tip into soil and directing seeds exiting said container from said hole of said front cover panel into the soil adjacent said tip of said spout; and said spout having a length defined from said cover panel of said front end cap to said top of said spout of 1½ inches.

10. A seed planter, comprising:

a container having opposite open front and back ends, and a longitudinal axis extending between said front and back ends of said container;

a front end cap substantially covering said front end of said container, a rear end cap substantially covering said back end of said container;

said front and rear end caps each having a cover panel and a perimeter lip extending around the cover panel of the respective end cap;

said cover panels of said end caps each substantially covering the associated end of said container, said perimeter lips of said end caps each being extending around said container adjacent the associated end of said container;

said front end cap having a hole through said cover panel of said front end cap;

a gate being slidably mounted on said cover panel of said front end cap;

said front end cap having a spout outwardly extending from said cover panel of said front end cap, said spout being positioned adjacent said hole of said front end cap;

wherein said gate has a generally semi-circular extent outwardly extending therefrom in a direction away from said cover panel of said front end cap, said extent of said gate having a plurality of substantially parallel and spaced apart lateral ridges;

said container having a generally rectangular transverse cross section in a plane substantially perpendicular to said longitudinal axis of said container and having a plurality of alternating side faces and side edges extending between said ends of said container; and said hole of said front end cap being positioned adjacent a juncture of two of said side faces such that tilting of said container facilitates alignment of the seeds along a length of the juncture of said two side faces inside said container for positioning the seeds for movement through said hole in a one-by-one manner.

11. The seed planter of claim 10, wherein a first pair of opposite side faces of said container lying in substantially parallel planes to one another, a second pair of opposite side faces of said container lying in substantially parallel planes to one another substantially perpendicular to said planes of said first pair of opposite side faces of said container.

12. The seed planter of claim 11, wherein said ends of said container lie in substantially parallel planes to one another substantially perpendicular to said longitudinal axis of said container.

13. The seed planter of claim 10, wherein said perimeter lips of said end caps frictionally hold each end cap to the associated end of said container.

14. The seed planter of claim 10, wherein said spout comprises a pair of generally triangular side panels, each of said side panels of said spout having a substantially straight outer edge, said outer edges of said side panels converging together in an outwardly direction from said cover panel of said front end cap to a pointed tip.

15. The seed planter of claim 14, wherein said side panels of said spout lie in planes forming an acute angle therebetween.

16. The seed planter of claim 15, wherein said side panels of said spout lie in substantially perpendicular planes to one another.

17. A seed planter, comprising:

a container having opposite open front and back ends, and a longitudinal axis extending between said front and back ends of said container;

a front end cap substantially covering said front end of said container, a rear end cap substantially covering said back end of said container;

said front and rear end caps each having a cover panel and a perimeter lip extending around the cover panel of the respective end cap;

said cover panels of said end caps each substantially covering the associated end of said container, said perimeter lips of said end caps each being extending around said container adjacent the associated end of said container;

said front end cap having a hole through said cover panel of said front end cap;

a gate being slidably mounted on said cover panel of said front end cap;

said front end cap having a spout outwardly extending from said cover panel of said front end cap, said spout being positioned adjacent said hole of said front end cap;

wherein said spout comprises a pair of generally triangular side panels, each of said side panels of said spout having a substantially straight outer edge, said outer edges of said side panels converging together in an outwardly direction from said cover panel of said front end cap to a pointed tip;

said container having a generally rectangular transverse cross section in a plane substantially perpendicular to said longitudinal axis of said container and having a plurality of alternating side faces and side edges extending between said ends of said container; and said hole of said front end cap being positioned adjacent a juncture of two of said side faces such that tilting of said container facilitates alignment of the seeds along a length of the juncture of said two side faces inside said container for positioning the seeds for movement through said hole in a one-by-one manner.

18. The seed planter of claim 17, wherein said side panels of said spout lie in planes forming an acute angle therebetween.

19. The seed planter of claim 17, wherein said side panels of said spout lie in substantially perpendicular planes to one another.

* * * * *